United States Patent
Maise et al.

(10) Patent No.: US 10,052,927 B2
(45) Date of Patent: Aug. 21, 2018

(54) METHOD AND DEVICE FOR AUTOMATICALLY OR SEMI-AUTOMATICALLY ADJUSTING A CHASSIS

(71) Applicant: Dr. Ing. h.c. F. Porsche Aktiengesellschaft, Stuttgart (DE)

(72) Inventors: Timo Maise, Ludwigsburg (DE); Stefan Jacobi, Boeblingen (DE); Axel Hammann, Althengstett (DE); Eric Wahl, Wiernsheim (DE); Claudia Grumann, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 101 days.

(21) Appl. No.: 14/729,088

(22) Filed: Jun. 3, 2015

(65) Prior Publication Data
US 2015/0343873 A1 Dec. 3, 2015

(30) Foreign Application Priority Data
Jun. 3, 2014 (DE) .................. 10 2014 107 765

(51) Int. Cl.
*B60G 17/015* (2006.01)
*B60G 17/019* (2006.01)
*B60G 17/0165* (2006.01)

(52) U.S. Cl.
CPC ......... *B60G 17/015* (2013.01); *B60G 17/019* (2013.01); *B60G 17/0165* (2013.01);
(Continued)

(58) Field of Classification Search
CPC ........................... B60G 17/005; B60G 17/015
(Continued)

(56) References Cited

U.S. PATENT DOCUMENTS 5,439,245 A * 8/1995 Breitenbacher ...... B60G 17/018
280/5.515
7,168,709 B2 1/2007 Niwa et al.
(Continued)

FOREIGN PATENT DOCUMENTS

DE 41 24 654 1/1993
DE 10 2007 042 877 3/2009
(Continued)

OTHER PUBLICATIONS

VDI Reports #778, (1989), "Adaptive ADS Damping for Control of Vehicle Suspension Dampers Dependent on Road Surface and State of Travel"m Klinkner, W.*
(Continued)

*Primary Examiner* — Minh Truong
*Assistant Examiner* — Michael E Butler
(74) *Attorney, Agent, or Firm* — Gerald E. Hespos; Matthew T. Hespos

(57) ABSTRACT

A method is provided for semi-automatically adjusting a chassis of a vehicle. The vehicle (10) assesses a state of the road by means of a sensor system of the vehicle and transmits the state of the road to a central server. A further vehicle (10) interrogates the state of the road from the server and recommends adjustment of the chassis as a function of the interrogated state of the road. The invention also relates to a device for carrying out such a method.

11 Claims, 1 Drawing Sheet

(52) U.S. Cl.
CPC .................. *B60G 17/01908* (2013.01); *B60G 2400/0531* (2013.01); *B60G 2400/0532* (2013.01); *B60G 2400/0533* (2013.01); *B60G 2400/208* (2013.01); *B60G 2400/252* (2013.01); *B60G 2400/821* (2013.01); *B60G 2401/142* (2013.01); *B60G 2600/20* (2013.01); *B60G 2800/012* (2013.01); *B60G 2800/014* (2013.01); *B60G 2800/016* (2013.01)

(58) Field of Classification Search
USPC ............................................................ 701/2
See application file for complete search history.

(56) References Cited

U.S. PATENT DOCUMENTS

| | | | | |
|---|---|---|---|---|
| 7,864,029 | B2* | 1/2011 | Huang | B60R 25/04 340/426.1 |
| 2003/0125845 | A1* | 7/2003 | Carlstedt | G08G 1/161 701/1 |
| 2004/0094912 | A1* | 5/2004 | Niwa | B60G 17/0165 280/5.518 |
| 2008/0269986 | A1* | 10/2008 | Regnell | B60G 17/019 701/37 |
| 2009/0012688 | A1* | 1/2009 | Hattori | B60G 17/0165 701/79 |
| 2009/0284359 | A1* | 11/2009 | Huang | B60R 25/04 340/426.1 |
| 2010/0087987 | A1* | 4/2010 | Huang | B60W 40/08 701/36 |
| 2010/0253539 | A1* | 10/2010 | Seder | G01S 13/723 340/903 |
| 2010/0253541 | A1* | 10/2010 | Seder | G01S 13/723 340/905 |
| 2012/0226413 | A1* | 9/2012 | Chen | B60R 16/037 701/36 |
| 2014/0163770 | A1* | 6/2014 | Wakao | B60W 40/068 701/1 |
| 2014/0309864 | A1* | 10/2014 | Ricci | H04W 48/04 701/36 |

FOREIGN PATENT DOCUMENTS

DE 11 2009 005 342 12/2012
DE 10 2013 016 974 3/2014

OTHER PUBLICATIONS

German Search Report of Feb. 26, 2015.

* cited by examiner

METHOD AND DEVICE FOR AUTOMATICALLY OR SEMI-AUTOMATICALLY ADJUSTING A CHASSIS

CROSS REFERENCE TO RELATED APPLICATION

This application claims priority under 35 USC 119 to German Patent Appl. No. 10 2014 107 765.2 filed on Jun. 3, 2014, the entire disclosure of which is incorporated herein by reference.

BACKGROUND

1. Field of the Invention

The invention relates to a method for automatically or semi-automatically adjusting a chassis of a vehicle and to a device for carrying out such a method.

2. Description of the Related Art

Acceleration sensors have been used throughout the vehicle manufacture industry for many years, for example to trigger air bags or within the scope of the electronic stability program (ESP). The measuring principle of an acceleration sensor is based on the known relationship between acceleration and force. A mass that is subject to a certain acceleration reacts with an inertial force to the body that applies the acceleration to the mass. By measuring the force acting between the mass and the body, the acceleration can be inferred in accordance with this relationship. By combining three acceleration sensors that are offset with respect to one another by 90° and that each respond only to forces in a spatial direction, it is possible to measure accelerations in each of these directions.

The prior art also has devices for detecting physical roadway properties, for example a driver assistance camera is arranged behind the front windshield of the vehicle and can be used for various driver assistance functions. The roadway boundaries are detected optically and permit conclusions to be drawn about the profile of the roadway and therefore constitute an important input parameter for functions such as the so-called lane departure warning system (LDW) or even an active lane keeping support system (LKS).

It also has been proposed in certain cases to collect vehicle data and make it available by a server. For example, DE 10 2007 042 877 A1 discloses a motor vehicle having a detection device for detecting a physical roadway property of the roadway that is traveled on by the motor vehicle. A position-determining device determines the position of the motor vehicle, a transmitter transmits roadway-property position data objects and a computer device is configured so that a detected roadway property and the corresponding position are converted into a roadway-property position data object. The roadway-property position data object is transmitted by the transmitter device.

On the other hand, the prior art does not comprise a comprehensive method that assists the driver in selecting the optimum chassis adjustment by making use of such "swarm" data.

The invention has been produced against the background of the prior art described above, and an object of the invention is to provide an automatic or semi-automatic method for adjusting a chassis, and a corresponding device.

SUMMARY OF THE INVENTION

The invention relates to a method that takes into account road damage, crests of hills or depressions to derive the adjustments for the hardness and height of the chassis that are favorable for the expected roadway profile. This comprises all the adjustment parameters of the suspension system, shock absorber system and/or stabilizer system as well as the position of the body of the vehicle with respect to the surface of the roadway, such as the height, rolling angle and pitching angle or an available clearance height in multistory car parks, bridges, tunnels etc. As a result, it is possible to avoid damage in the region of the underbody and roof by adjusting the height of the vehicle body, for example in the context of curb stones, a poor quality road, off-road conditions, multistory car parks, ramps, clearance height etc.

The definition of semi-automatic in the present context comprises the proposal of an improved chassis control system adjustment to the driver and the acceptance of this adjustment by driver confirmation or the selection of this adjustment by the driver in the vehicle operator control system. Automatic defines the automatic acceptance of the proposed adjustment without driver confirmation.

DETAILED DESCRIPTION

Figure 1:
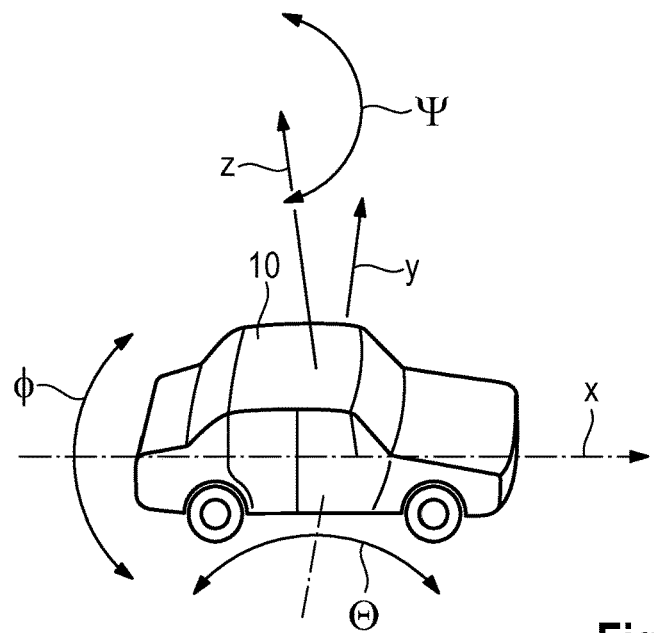
FIG. 1 shows a vehicle equipped with a device according to the invention in an object-related right-handed co-ordinate system.
Figure 2:
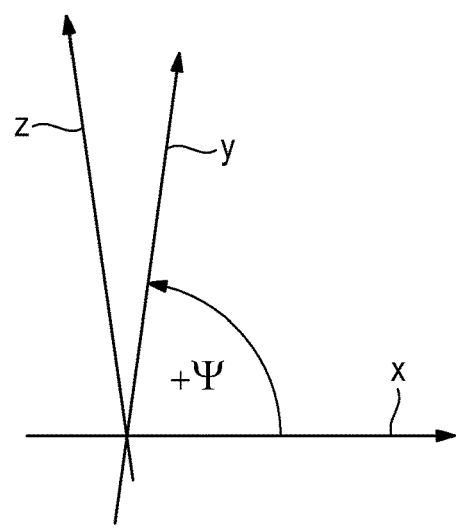
FIG. 2 shows the east-north-up-reference system that is customary as a reference co-ordinate system for land vehicles.

FIG. 1 illustrates a land vehicle 10 that is equipped in a body-fixed co-ordinate system which, in terms of the basic orientation of the vehicle 10, is congruent with the reference co-ordinate system illustrated in FIG. 2. To describe the orientation of the vehicle 10 within the object co-ordinate system in FIG. 1, use is made of the rolling-pitching-yawing angles $\phi$, $\theta$, $\psi$, that are known from aeronautics and that can be converted by transformations that are familiar to a person skilled in the art into the Cartesian co-ordinates defined by the co-ordinate axes x, y, z in FIGS. 1 and 2.

To detect the rolling-pitching-yawing angles $\phi$, $\theta$, $\psi$ in FIG. 1, the vehicle 10 is equipped with a sensor system that comprises three acceleration sensors (not illustrated in the drawings). The sensor system permits the vehicle 10 to carry out reliable assessment of the state of the road. The sensor system of the vehicle 10 also includes a camera and/or at least one spring travel sensor connected to the chassis of the vehicle 10 and/or at least one wheel acceleration sensor and/or at least one wheel pressure sensor.

The described sensor system provides the vehicle 10 with various indications of possible crests of hills, depressions, unpaved roads or damage to the road such as for example potholes that occur in the course of the roadway of the vehicle 10 and imply that a fine adjustment of the chassis is desirable.

Therefore, for example, the image that is provided by the camera and further-processed digitally permits early detection of possible crests of hills. In this regard, the person skilled in the art is familiar with optical algorithms that are relevant for pattern recognition and that permit the profile of the roadway boundaries to be followed on the basis of the image data that are provided. If it becomes apparent then that the camera that is mounted, for example, behind the front windshield of the vehicle 10 detects the roadway boundaries only up to a short distance, this horizon permits an approaching crest of a hill in the course of the roadway to be inferred.

The acceleration sensors also provide various oedometric indications of the quality of the roadway. On the basis of the pitching angle θ shown in FIG. 1, for example, the detection of the signed inclination of the road supplies reference points for the travel over a crest of a hill at the transition from a positive inclination to a negative inclination and for the presence of a depression in the inverse case.

A sudden change in the acceleration detected in the vertical direction z according to FIGS. 1 and 2 also indicates the occurrence of depressions or crests of hills. If a decrease in the vertical acceleration is registered here, it is to be assumed that there is a crest of a hill, and in the case of an increase it is to be assumed that there is a depression in the course of the roadway. In contrast, severe fluctuations in this measured value indicate possible unevennesses in the form of potholes or an unpaved state of the road.

Finally, the vehicle 10 also includes the data provided by the spring travel sensor in the assessment of the state of the road. Brief fluctuations here also are an indication of vibrations such as originate from unpaved roads or potholes. A sudden increase in the spring travel, however, may serve as an indication to the vehicle 10 of a possible crest of a hill, and the opposite development may serve as an indication of a corresponding depression in the course of the road.

The raw data that is detected continuously in this way or the evaluation derived therefrom are transmitted by the vehicle 10 to a central server that may be remote from the vehicle together with current position data that is provided, for example, by a commercially available GPS receiver. This server stores the received data pairs or assigns the additionally provided information about the corresponding state of the road to an already existing position data record. Within this framework, the server can carry out plausibility checking or consolidation of the data from different sources to exclude errored data or faults in the sensor system of individual vehicles 10 from its data pool, and therefore the quality of the data is increased by continuously adapting and improving the statistics used as the basis.

If a certain reliability of the state of the road information of the server can be assumed for a certain position in view of the collected data quantity, this server for its part transmits the available data to further vehicles 10 that are approaching the respective position. These further vehicles 10 can use the available data to derive suitable recommendations for the adjustment of their respective chassis. If the adjustment which is considered to be optimum does not in any case correspond to the current values, the further vehicles 10 submit corresponding recommendations in terms of the hardness and height of the chassis to their respective drivers. This comprises all the adjustment parameters of the suspension system, shock absorber system and the stabilizer system and the position of the body of the vehicle with respect to the surface of the roadway such as the height, rolling angle and pitching angle or an available clearance height in multistory car parks, bridges, tunnels etc. In the case of a relevant confirmation by the driver, the proposed adjustments can be accepted immediately.

What is claimed is:

1. A method for adjusting a chassis of a vehicle, the method comprising the steps of:
    determining a geographical position of a first vehicle;
    utilizing a sensing device on the first vehicle for assessing clearance heights at a multistory car park, bridge, tunnel or ramp that could damage an underbody or roof of the vehicle and assessing a characteristic of a road at the geographical position;
    transmitting data regarding the assessed clearance heights, the assessed characteristic of the road and geographical position from the first vehicle to a central server;
    storing the assessed characteristic and geographical position in memory associated with the central server;
    enabling a second vehicle to interrogate the central server regarding the clearance heights and the characteristic of the road at the geographical position;
    transmitting data regarding the assessed clearance heights and the assessed characteristic of the road at the geographical position from the central server to the second vehicle;
    automatically adjusting the height of the second vehicle sufficiently to prevent damage to the underbody or roof of the second vehicle based on the assessed clearance heights;
    using the data regarding the assessed characteristic of the road at the geographical position to derive recommendations for adjusting the chassis of the second vehicle;
    proposing the recommendations for adjusting the chassis of the second vehicle to the driver of the second vehicle based on the assessed characteristics of the road; and
    adjusting the chassis of the second vehicle according to the recommendations when the driver authorizes implementation of the recommendations.

2. The method of claim 1, further comprising the step of enabling the central server to calculate and store indications related to the assessed characteristic of the road at the geographical position, the indications including at least one a crest of a hill, a depression, road damage, a curb stone, and a ramp.

3. The method of claim 2, further comprising the step of enabling the central server to assign a plurality of indications to a plurality of geographical positions to create a plurality of data pairs.

4. The method of claim 3, further comprising the step of enabling the second vehicle to access at least one of the data pairs when the second vehicle approaches at least one of the respective geographical positions.

5. The method of claim 1, further comprising the steps of:
    operating a camera on the first vehicle to detect an image of the road; and
    digitally processing the image to assess the characteristic of the road.

6. The method of claim 5, further comprising the steps of:
    digitally processing the image to detect roadway boundaries; and
    enabling the first vehicle to inform the central server of the presence of a crest of a hill if the roadway boundaries are not detected beyond a predefined distance from the first vehicle.

7. The method of claim 1, further comprising the steps of:
    operating an acceleration sensor on the first vehicle for detecting an inclination of the road;
    informing the central server of the presence of a crest of a hill when the acceleration sensor detects a change from a positive inclination to a negative inclination; and
    informing the central server of the presence of a depression in the road when the acceleration sensor detects a change from a negative inclination to a positive inclination.

8. The method of claim 7, further comprising the steps of:

operating the acceleration sensor for detecting a vertical acceleration;

informing the central server of a crest of a hill if the acceleration sensor detects a sudden decrease in the vertical acceleration;

informing the central server of a depression in the road if the acceleration sensor detects a sudden increase in the vertical acceleration; and informing the central server of the presence of one of a pothole and an unpaved portion of the road if the acceleration sensor detects a large fluctuation in the vertical acceleration.

9. The method of claim 1, further comprising the steps of:

using a spring travel sensor that is connected to the chassis of the first vehicle, the spring travel sensor being operative for detecting a spring travel of the vehicle;

informing the central server of a crest of a hill if the spring travel sensor detects a sudden increase in the spring travel;

informing the central server of a depression in the road if the spring travel sensor detects a sudden decrease in the spring travel; and informing the central server of the presence of one of a pothole and an unpaved portion of road if the spring travel sensor detects a large fluctuation in the spring travel.

10. The method of claim 1, further comprising the step of using at least one wheel acceleration sensor connected to the chassis of the first vehicle for detecting a wheel acceleration of a wheel of the first vehicle.

11. The method of claim 1, further comprising the step of using at least one wheel speed sensor connected to the chassis of the first vehicle for detecting a wheel rotational speed of a wheel of the first vehicle.

* * * * *